(12) United States Patent
Nakagawa et al.

(10) Patent No.: US 11,091,190 B2
(45) Date of Patent: Aug. 17, 2021

(54) RACK GUIDE AND GEAR MECHANISM

(71) Applicant: OILES CORPORATION, Tokyo (JP)

(72) Inventors: Noboru Nakagawa, Kanagawa (JP); Hiroyuki Kikuchi, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 199 days.

(21) Appl. No.: 16/490,093

(22) PCT Filed: Mar. 12, 2018

(86) PCT No.: PCT/JP2018/009595
§ 371 (c)(1),
(2) Date: Aug. 30, 2019

(87) PCT Pub. No.: WO2018/168814
PCT Pub. Date: Sep. 20, 2018

(65) Prior Publication Data
US 2020/0283055 A1      Sep. 10, 2020

(30) Foreign Application Priority Data

Mar. 16, 2017 (JP) .............................. JP2017-051957

(51) Int. Cl.
*B62D 3/12* (2006.01)
*F16H 55/28* (2006.01)
*F16H 19/04* (2006.01)

(52) U.S. Cl.
CPC ............ *B62D 3/123* (2013.01); *F16H 19/04* (2013.01); *F16H 55/283* (2013.01)

(58) Field of Classification Search
CPC .. F16H 55/283; F16H 19/04; F16H 2055/281; B62D 3/123; B62D 3/126; B62D 3/12
See application file for complete search history.

(56) References Cited

U.S. PATENT DOCUMENTS 3,623,379 A * 11/1971 Bradshaw et al. ..... B62D 3/123
74/498
3,979,968 A * 9/1976 Ceccherini ............. B62D 3/123
74/498

(Continued)

FOREIGN PATENT DOCUMENTS

JP        11-91592      4/1999
JP      2000-177604     6/2000

(Continued)

OTHER PUBLICATIONS

International Search Report for PCT/JP2018/009595 dated May 22, 2018, 3 pages.

(Continued)

*Primary Examiner* — William Kelleher
*Assistant Examiner* — Gregory T Prather
(74) *Attorney, Agent, or Firm* — Nixon & Vanderhye P.C.

(57) ABSTRACT

The objective of the present invention is to reduce the impact of production variability in a radius of curvature of a rear surface of a rack bar, for example, while enlarging a region of contact with the rack bar. A concave surface (330) is used as a rack guide seat (32) sliding surface (33). In a YZ cross section perpendicular to an axial direction of a rack bar, the concave surface (330) includes: a pair of first arcuate surfaces (331A, 331B) which are disposed on a peripheral edge side (320) of the sliding surface (33), from two positions of contact TA, TB with a rack bar rear surface (22), the positions of contact TA, TB having line symmetry with respect to a straight Line O3 joining a center O of a rack bar (20) with a bottom portion center C of the sliding surface (33), and which have line symmetry with respect to the straight Line O3; and a pair of second arcuate surfaces (332A, 332B) which are disposed on a bottom portion side (321) of the sliding surface (33), from the positions of contact TA, TB, and which have line symmetry with respect (Continued)

to the straight Line O3. With regard to gaps to the rack bar rear surface (22) in positions separated by the same distance from the positions of contact TA, TB, the gaps from the first arcuate surfaces (331A, 331B) are greater than the gaps from the second arcuate surfaces (332A, 332*b*).

4 Claims, 4 Drawing Sheets

(56) References Cited

U.S. PATENT DOCUMENTS

| | | | | | |
|---|---|---|---|---|---|
| 4,263,817 | A | * | 4/1981 | Taig | B62D 3/12 74/422 |
| 4,593,578 | A | * | 6/1986 | Kobayashi | B62D 3/123 180/428 |
| 4,651,585 | A | * | 3/1987 | Donn | B62D 3/123 74/422 |
| 5,660,078 | A | * | 8/1997 | Phillips | B62D 3/123 180/427 |
| 5,718,149 | A | * | 2/1998 | Phillips | B62D 3/123 74/422 |
| 5,802,919 | A | * | 9/1998 | Phillips | F16H 55/283 384/37 |
| 5,845,532 | A | * | 12/1998 | Phillips | B62D 3/123 74/422 |
| 5,906,138 | A | * | 5/1999 | Kostrzewa | B62D 3/123 74/498 |
| 6,076,417 | A | * | 6/2000 | Engler | B62D 3/12 180/427 |
| 6,178,843 | B1 | * | 1/2001 | Machida | B62D 3/123 74/498 |
| 6,247,375 | B1 | * | 6/2001 | Gierc | B62D 3/12 74/388 PS |
| 6,357,314 | B1 | * | 3/2002 | Sommer | B62D 3/123 180/427 |
| 6,390,230 | B1 | * | 5/2002 | Shimizu | B21K 1/767 180/444 |
| 6,408,708 | B1 | * | 6/2002 | Sahr | B62D 3/123 180/428 |
| 6,427,552 | B1 | * | 8/2002 | Sahr | B62D 3/123 180/427 |
| 6,467,366 | B1 | * | 10/2002 | Gierc | B62D 3/123 384/58 |
| 2002/0124670 | A1 | * | 9/2002 | Bugosh | B62D 3/123 74/388 PS |
| 2003/0052468 | A1 | * | 3/2003 | Harer | B62D 5/22 280/93.514 |
| 2008/0006111 | A1 | * | 1/2008 | Douma | F16H 55/26 74/422 |
| 2008/0034911 | A1 | * | 2/2008 | Bieber | B62D 3/123 74/422 |
| 2009/0038429 | A1 | * | 2/2009 | Hirose | B62D 3/123 74/498 |
| 2009/0107271 | A1 | * | 4/2009 | Matsuo | F16H 55/283 74/422 |
| 2009/0120226 | A1 | * | 5/2009 | Nishikubo | B62D 3/123 74/422 |
| 2009/0317025 | A1 | * | 12/2009 | Witting | B62D 3/123 384/37 |
| 2015/0191197 | A1 | * | 7/2015 | Lucchi | F16H 19/04 74/409 |
| 2015/0197274 | A1 | * | 7/2015 | Brochot | B62D 3/123 74/409 |
| 2015/0291205 | A1 | * | 10/2015 | Nishitani | B21J 5/00 74/409 |
| 2016/0131242 | A1 | * | 5/2016 | Taoka | F16H 55/28 74/422 |
| 2016/0185382 | A1 | * | 6/2016 | Ejima | B62D 3/00 74/29 |
| 2017/0225703 | A1 | * | 8/2017 | Oikawa | F16H 55/26 |
| 2018/0201304 | A1 | * | 7/2018 | Miyoshi | B62D 5/0424 |
| 2019/0016368 | A1 | * | 1/2019 | Djie | B62D 3/123 |
| 2019/0135329 | A1 | * | 5/2019 | Feldpausch | B62D 3/123 |
| 2019/0202489 | A1 | * | 7/2019 | Muehling | F16C 29/02 |
| 2019/0366422 | A1 | * | 12/2019 | Mizushima | B21J 13/14 |
| 2020/0140002 | A1 | * | 5/2020 | James | B62D 3/126 |
| 2020/0283056 | A1 | * | 9/2020 | Douglas | F16H 55/283 |

FOREIGN PATENT DOCUMENTS

| | | |
|---|---|---|
| JP | 2001-10510 | 1/2001 |
| JP | 2015-196419 | 11/2015 |
| WO | 2008/149556 | 12/2008 |

OTHER PUBLICATIONS

Extended European Search Report for Application No. 18767125.0 (dated Oct. 26, 2020), 3 pages.

* cited by examiner

RACK GUIDE AND GEAR MECHANISM

This application is the U.S. national phase of International Application No. PCT/JP2018/009595 filed Mar. 12, 2018 which designated the U.S. and claims priority to JP Patent Application No. 2017-051957 filed Mar. 16, 2017, the entire contents of each of which are hereby incorporated by reference.

TECHNICAL FIELD

The present invention relates to a rack guide (support yoke) which presses a rack bar against a pinion while guiding the rack bar in the axial direction of the rack bar in a rack-and-pinion mechanism used, for example, in a steering device of an automobile, and to a gear mechanism using the rack guide.

BACKGROUND ART

In a rack-and-pinion mechanism such as used in a steering device of an automobile, the rack guide described in the Patent Literature 1 is known as an example of a rack guide which is placed in a rack case on the side of a rear surface (an arc surface on the side opposite to a rack gear) of a rack bar and which presses the rack bar against a pinion while guiding the rack bar in the axial direction of the rack bar.

This rack guide comprises: a rack guide body which is biased toward the rear surface of a rack bar by means of resilient force of a coil spring inserted between a cap of a rack case and the rack guide body; and a rack guide sheet (support yoke sheet) which is positioned between the rear surface of the rack bar and the rack guide body and supports the rear surface of the rack bar slidably.

The rack guide sheet is a member curved in conformity with the shape of the rear surface of the rack bar, and, as a sliding surface for supporting the rear surface of the rack bar, has a concave surface including a pair of arc surfaces which are, in cross-section perpendicular to the axial direction of the rack bar, line-symmetrical with respect to a line connecting the center of the rack bar to the center of the bottom of the rack guide sheet. Each of this pair of arc surfaces has an arcuate cross-section shape whose curvature center is closer to the rack gear than the curvature center of the cross-section shape (arc shape) of the rear surface of the rack bar and has the curvature radius larger than that of the cross-section shape of the rear surface. In cross-section perpendicular to the axial direction of the rack bar, the rear surface of the rack bar is in contact with the sliding surface at two positions which are line-symmetrical with respect to the line connecting the center of the rack bar to the center of the bottom of the rack guide sheet. Further, on the back surface (i.e. the surface on the side opposite to the sliding surface) of the rack guide sheet, a boss is formed for fixing the rack guide sheet to the rack guide body.

The rack guide body has a recessed portion formed to have a shape curved in conformity with the shape of the back surface of the rack guide sheet. The rack guide sheet is tightly received in the inside of the recessed portion. In a central area of the recessed portion of the rack guide body, a through-hole for fixing the rack guide sheet is formed, and the rack guide sheet is fixed to the rack guide body by pressing the boss into the through-hole.

As described above, in the rack guide described in the Patent Literature 1, the rear surface of the rack bar is in contact with the sliding surface at the two positions which are line-symmetrical with respect to the line connecting the center of the rack bar to the center of the rack guide sheet in cross-section perpendicular to the axial direction of the rack bar. Accordingly, it is possible to prevent backlash of the rack bar in the direction perpendicular to the line connecting the center of the rack bar to the center of the bottom of the rack guide sheet in cross-section perpendicular to the axial direction of the rack bar, and thus it is possible to support slidably the rear surface of the rack bar stably.

CITATION LIST

Patent Literature

Patent Literature 1: Japanese Unexamined Patent Application Laid-Open No. 2000-177604

SUMMARY OF INVENTION

Technical Problem

In the case where contact between the sliding surface of the rack guide sheet and the rear surface of the rack bar is line contact, the load tends to concentrate in one point and abrasion tends to occur. Thus, it is favorable to disperse the load by making the curvature radius of the sliding surface of the rack guide sheet closer to the curvature radius of the rear surface of the rack bar so as to widen the contact area between the sliding surface of the rack guide sheet and the rear surface of the rack bar. However, production variation in the curvature radius of the sliding surface of the rack guide sheet or the rear surface of the rack bar may deviate the contact area toward the opening (periphery) of the rack guide sheet. In that case, the following problem occurs.

That is to say, assuming that W is for the vertical load applied to the sliding surface of the rack guide sheet at a contact position with the rear surface of the rack bar, P is for the input load (load in the direction of a line connecting the center of the rack bar to the center of the rack guide sheet) inputted to the rack guide from the rack bar at the contact position, $\theta$ is for the angle formed between the loading direction of the vertical load W and the loading direction of the input load P, $\mu$ is for the friction coefficient, and F is for the friction force generated at the contact position of the sliding surface of the rack guide sheet, then $F=\mu W=\mu P/\cos\theta$ holds. Thus, in the case where the input load P and the friction coefficient $\mu$ are constant, the larger the formed angle $\theta$ becomes, the larger the friction force becomes (wedge effect). Accordingly, as the contact area between the sliding surface of the rack guide sheet and the rear surface of the rack bar is deviated toward the opening of the rack guide sheet, the formed angle $\theta$ at the contact position becomes larger and the friction force F becomes larger (i.e. the wedge effect increases), and the sliding performance of the rack guide decreases.

The present invention has been made taking the above conditions into consideration, and an object of the present invention is to provide a rack guide which can reduce the influence of the production variation in the curvature radius of the sliding surface of the rack guide sheet or the rear surface of the rack bar on the friction force between the rear surface of the rack bar and the sliding surface of the rack guide sheet, while widening the contact area with the rack bar, and to provide a gear mechanism using the rack guide.

Solution to Problem

To solve the above problems, the present invention uses, as a sliding surface for slidably supporting an arcuate rear surface of a rack bar, a concave surface which is in contact with the rear surface of the rack bar at two contact positions line-symmetrical with respect to a line connecting the center of the rack bar and the center of the bottom of the sliding surface in cross-section perpendicular to the axial direction of the rack bar. This concave surface includes a pair of first arc surfaces which are positioned on the periphery side of the sliding surface from the respective contact positions and line-symmetrical with respect to the above-mentioned line, and a pair of second arc surfaces which are positioned on the bottom side of the sliding surface from the respective contact positions and line-symmetrical with respect to the above-mentioned line. Further, in cross-section perpendicular to the axial direction of the rack bar, as for gaps with the rear surface of the rack bar at positions of the same distance from the respective contact positions, gaps of the first arc surfaces are made to be larger than the gaps of the second arc surfaces.

For example, the present invention provides a rack guide for slidably supporting a rack bar, which has a rack gear formed to engage with a pinion gear, on an opposite side to the rack gear and for guiding the rack bar in axial direction of the rack bar moving according to rotation of the pinion gear, comprising:

a sliding surface which supports an arcuate rear surface formed in the rack bar on an opposite side to the rack gear, wherein:

the sliding surface has a concave surface which is, in cross-section perpendicular to the axial direction of the rack bar, in contact with the rear surface of the rack bar at two contact positions line-symmetrical with respect to a line connecting a center of the rack bar to a center of a bottom of the sliding surface;

the concave surface includes a pair of first arc surfaces which are line-symmetrical with respect to the line and positioned on a periphery side of the sliding surface from the respective contact positions, and includes a pair of second arc surfaces which are line-symmetrical with respect to the line and positioned on a bottom side of the sliding surface from the respective contact positions; and in the cross-section perpendicular to the axial direction of the rack bar, the first arc surfaces have larger gaps with the rear surface of the rack bar than gaps of the second arc surfaces with the rear surface of the rack bar at positions of a same distance from the respective contact positions.

Further, the present invention provides a gear mechanism for changing a travelling direction of a moving body according to rotation of a steering wheel, comprising:

a pinion gear which rotates according to the rotation of the steering wheel;

a rack bar which has a rack gear formed to engage with the pinion gear and reciprocates according to the rotation of the pinion gear owing to the engagement of the rack gear with the pinion gear, to change a direction of wheels of the moving body;

the rack guide which slidably supports the rack bar in an axial direction of the rack bar; and a resilient body which biases the rack guide in a direction of pressing the rack gear against the pinion gear.

Advantageous Effects of Invention

In the case where the curvature radius of the sliding surface of the rack guide sheet or the curvature radius of the rear surface of the rack bar includes production variation and an actual position of contact between the rack guide sheet and the rack bar deviates to the bottom side of the sliding surface, the deviation is in the direction of making the formed angle θ smaller and does not cause a problem. However, in the case where a deviation occur to the side of the opening (or the periphery) of the sliding surface, the deviation is in the direction of making the formed angle θ larger and causes a problem. In the present invention, the sliding surface for slidably supporting the rear surface of the rack bar comprises, in cross-section perpendicular to the axial direction of the rack bar: a pair of first arc surfaces which are positioned on the periphery side of the sliding surface from the respective contact positions with the rear surface of the rack bar and line-symmetrical with respect to the line connecting the center of the rack bar and the center of the bottom of the sliding surface; and a pair of second arc surfaces which are positioned on the bottom side of the sliding surface from the respective contact positions and line-symmetrical with respect to the line connecting the center of the rack bar and the center of the bottom of the sliding surface. Further, in the cross-section perpendicular to the axial direction of the rack bar, as for gaps with the rear surface of the rack bar at positions of a same distance from the respective contact positions, the gaps of the first arc surfaces are larger than the gaps of the second arc surfaces. As a result, it is possible to suppress increase of the formed angle θ when an actual contact position deviates to the side of the opening of the sliding surface, and accordingly to suppress increase of the friction force between the sliding surface of the rack guide sheet and the rear surface of the rack bar. Thus, the present invention can reduce the influence of the production variation in the curvature radius of the sliding surface of the rack guide sheet or the curvature radius of the rear surface of the rack bar on the friction force between the rear surface of the rack bar and the sliding surface of the rack guide sheet, while widening the contact area with the rack bar.

DESCRIPTION OF EMBODIMENTS

In the following, one embodiment of the present invention will be described referring to the attached drawings. For the sake of convenience of explanation, the axial direction of a rack bar 20 (moving direction of the rack bar 20) is referred to as theXdirection, the direction of pressing a rack gear 21 against a pinion gear 11 is referred to as the Z direction, and the direction perpendicular to the X and Z directions is referred to as the Y direction. These directions are displayed in each figure suitably.

Figure 1:
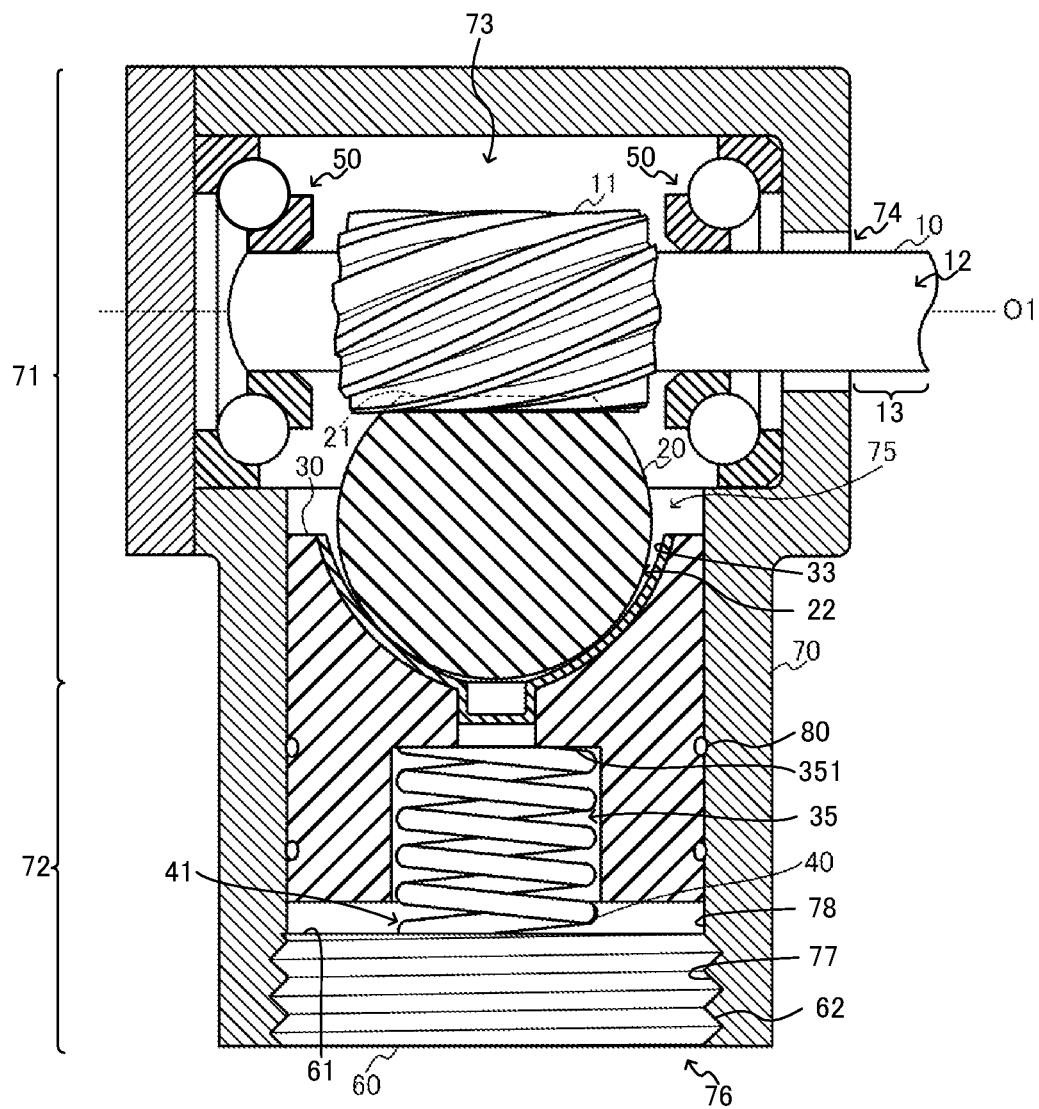
FIG. 1 is a cross-section view of a gear mechanism 1 of a steering device according to one embodiment of the present invention.

FIG. 1 is a cross-section view of a gear mechanism 1 of a steering device according to the present embodiment.

The steering device of the present embodiment has the rack-and-pinion type gear mechanism 1 which converts rotary movement of a steering shaft to linear movement and transmits the linear movement to a link mechanism for changing the direction of wheels.

As shown in the figure, the gear mechanism 1 comprises: a pinion shaft 10 in which a pinion gear 11 is formed; a rack bar 20 in which a rack gear 21 to engage with the pinion gear 11 is formed; bearings 50 which support the pinion shaft 10 rotatably; a rack guide 30 which guides the rack bar 20 reciprocating in the X direction when the pinion gear 11 rotates; a coil spring 40 which biases the rack guide 30 in the Z direction so as to press the rack gear 21 against the pinion gear 11; a housing 70 into which the mentioned parts 10-50 are incorporated; and a cap 60. As described below, the gear mechanism 1 may further comprise ring-shaped elastic members (for example, O-rings) 80, which are placed between an inner wall surface 78 of a cylinder case part of the housing 70 and an outer peripheral surface of a base part 31 of the rack guide 30.

The pinion shaft 10 is a cylindrical member positioned so that its axis O1 is inclined with respect to the Y direction. In the outer peripheral surface 12 of the pinion shaft 10, for example a helical gear is formed as the pinion gear 11. The pinion gear 11 is housed in a pinion gear housing part 73 of the housing 70, and the pinion shaft 10 is supported by the housing 70, on both sides of the pinion gear 11 via the bearings 50 so as to be rotatable around the axis O1. Further, one end 13 of the pinon shaft 10 projects to the outside of the pinion gear housing part 73 through an opening 74 formed in the housing 70, and is linked to the steering shaft not shown. Owing to this arrangement, the pinion gear 11 rotates in conjunction with the steering shaft that rotates according to operation of a steering wheel.

The rack bar 20 is a cylindrical member positioned along the X direction, and, although not shown, both its ends are linked to the link mechanism for changing the direction of the wheels via ball joints. A plurality of teeth constituting the rack gear 21 are formed in the outer peripheral surface of the rack bar 20 so as to be arranged in line in the X direction, and are engaged with the teeth of the pinion gear 11 at a predetermined engagement position in the pinion gear housing part 73 of the housing 70. This rack bar 20 is slidably supported by a sliding surface 33 of the rack guide 30 at an arcuate rear surface 22 (an outer peripheral surface which has an arc shape in YZ cross-section and is opposed to the sliding surface 33 of the rack guide 30) on the opposite side to the rack gear 21. When the pinion shaft 10 rotates together with the steering shaft, the rack bar 20 reciprocates in the X direction owing to the engagement of the pinion gear 11 with the rack gear 21 while being guided by the sliding surface 33 of the rack guide 30, and swings the link mechanism. As a result, the direction of the wheels changes according to operation of the steering wheel.

The housing 70 comprises: a rack case part 71 of a cylindrical shape which is positioned along the X direction; and a cylinder case part 72 which projects in the Z direction from the outer periphery of the rack case part 71.

In the inside of the rack case part 71, the rack bar 20 is housed movably in the X direction. Further, in the inside of the rack case part 71, the pinion gear housing part 73 is provided. As described above, the pinion gear housing part 73 houses the pinion gear 11, and the bearings 50 supporting the pinion shaft 10 rotatably so that the pinion gear 11 engages with the rack gear 21 at the predetermined engagement position. Further, in the rack case part 71, the opening 74 which connects the pinion gear housing part 73 with the outside is formed to open toward the steering shaft not shown, and the one end 13 of the pinion shaft 10 linked to the steering shaft not shown projects through the opening 74 to the outside of the pinion gear housing part 73.

On the other hand, the cylinder case part 72 is formed integrally with the rack case part 71 so as to be positioned on the side opposite to the pinion gear 11 with respect to the rack bar 20 (i.e. positioned on the side of the rear surface 22 of the rack bar 20). The inside of the cylinder case part 72 and the inside of the rack case part 71 are connected with each other via an opening 75 which faces the pinion gear 11 in the pinion gear housing part 73. Further, a threaded portion 77 for fixing the cap 60 is formed in the inner wall surface 78 of an open end 76 of the cylinder case part 72.

Figure 2:
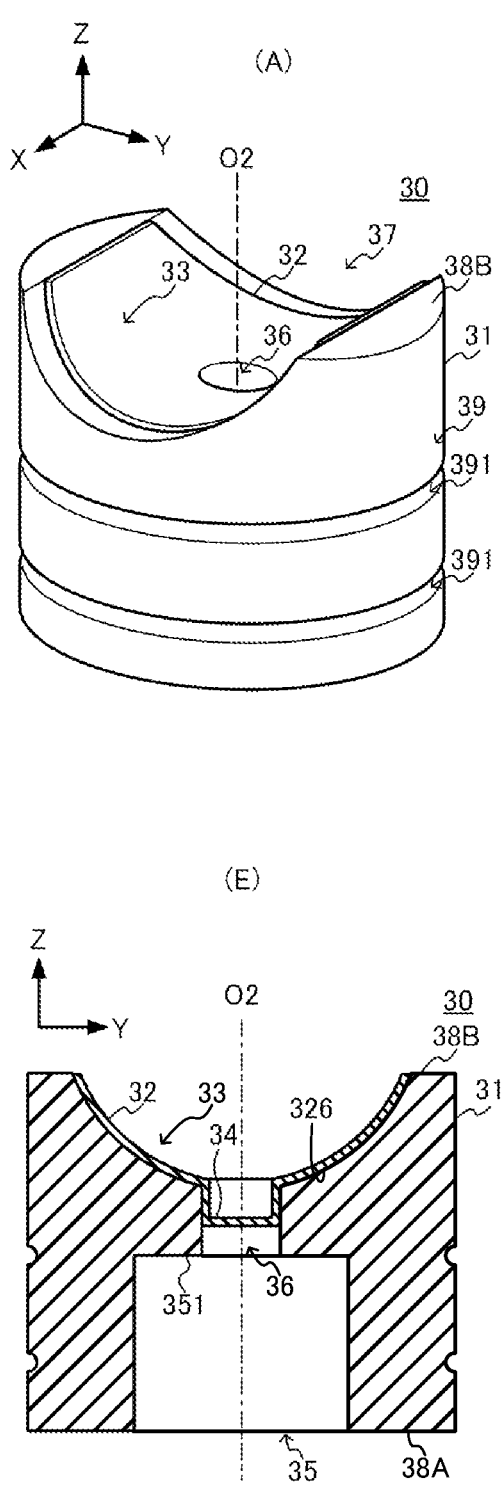
FIGS. 2(A), 2(B), 2(C), and 2(D) are respectively an external view, a plan view, a front view, and a bottom view of a rack guide 30.
FIG. 2(E) is an A-A cross-section view of FIG. 2(B)

The rack guide 30 is housed slidably in the Z direction in the inside of the cylinder case part 72 so that one end surface provided with the sliding surface 33 for slidably supporting the rear surface 22 of the rack bar 20 (in FIG. 2, the one end surface 38B of the base part 31) faces toward the rear surface 22 of the rack bar 20. The rack guide 30 is positioned on the side opposite to the pinion gear 11 with respect to the rack bar 20 (i.e. on the side of the rear surface 22 of the rack bar 20 at the position of the engagement between the pinion gear 11 and the rack gear 21). Further, on the side of the other end surface of the rack guide 30 (in FIG. 2, the other end surface 38A of the base part 31), a spring guide (bottomed hole) 35 for the coil spring 40 is provided. The detailed structure of the rack guide 30 will be described later.

The coil spring 40 is housed in the cylinder case part 72 of the housing 70 so as to be inserted into the spring guide 35 of the rack guide 30. When the cap 60 is fitted in the open end 76 of the cylinder case part 72 of the housing 70, the coil spring 40 is located between the rack guide 30 and the inner side surface 61 of the cap 60 in the cylinder case part 72 of the housing 70. The natural length of the coil spring 40 is longer than the depth of the spring guide 35 of the rack guide 30, and accordingly one end 41 of the coil spring 40 projects out of the spring guide 35 of the rack guide 30 toward the inner side surface 61 (the one surface faced toward the inside of the cylinder case part 72) of the cap 60.

The cap 60 has a circular plate shape which can be fitted into the open end 76 of the cylinder case part 72, and a threaded portion 62 is formed in the outer periphery of the cap 60. After inserting the rack guide 30 in the cylinder case part 72 of the housing 70 and then placing the coil spring 40 in the spring guide 35 of the rack guide 30, by screwing the threaded portion 62 of the cap 60 into the threaded portion 77 of the open end 76 of the cylinder case part 72, the cap 60 is fixed in the open end 76 of the cylinder case part 72, to close the cylinder case part 72. At the same time, the coil spring 40 is compressed between the inner side surface 61 of the cap 60 and the bottom surface 351 of the spring guide 35 of the rack guide 30. Accordingly, the rack bar 20 is biased toward the pinion gear 11 owing to the restoring force of the coil spring 40, so as to press the rack gear 21 against the pinion gear 11. Thereby, disengagement of teeth at the engagement position between the rack gear 21 and the pinion gear 11 is prevented.

Next, detailed structure of the rack guide 30 will be described.

FIGS. 2(A), 2(B), 2(C), and 2(D) are respectively an external view, a plan view, a front view, and a bottom view of the rack guide 30, and FIG. 2(E) is an A-A cross-section view of FIG. 2(B).

As shown in the figures, the rack guide 30 comprises: the base part 31 of a cylindrical shape formed of metal material or the like superior in durability and impact resistance; and a rack guide sheet 32 which is fixed on the side of one end surface 38B of the base part 31.

In the other end surface 38A of the base part 3, the bottomed hole is formed as the spring guide 35. As described above, the coil spring 40 is inserted into this spring guide 35 and compressed between the bottom surface 351 of the spring guide 35 and the inner side surface 61 of the cap 60 by screwing the cap 60 into the open end 76 of the cylinder case part 72.

In a central area (area surrounding the axis O2 of the base part 31) of the one end surface 38B of the base part 31, there is formed a groove part 37 of a shape curved in conformity with the shape of the back surface (the surface on the side of the base part 31) 326 of the rack guide sheet 32. Further, in a central area (area surrounding the axis O2 of the base part 31) of the groove part 37, there is formed a sheet-fixing through-hole 36 into which a boss part 34 of the rack guide sheet 32 is to be pressed.

At least one groove 391 may be formed in the circumferential direction in the outer peripheral surface 39 of the base part 31, so as to fit a ring-shaped elastic member 80 such as an O-ring having the cross section diameter larger than the depth of the groove 391 into the inside of the groove 391. By this arrangement, the ring-shaped elastic member 80 surrounding the base part 31 in the circumferential direction is compressed between the inner wall surface 78 of the cylinder case part 72 of the housing 70 and the outer peripheral surface 39 of the base part 31, and as a result the elastic force of the elastic member 80 prevents backlash of the rack guide 30.

The rack guide sheet 32 is a member curved in conformity with the curved shape of the rear surface 22 of the rack bar 20, and has the sliding surface 33 for slidably supporting the rear surface 22 of the rack bar 20.

Figure 3:
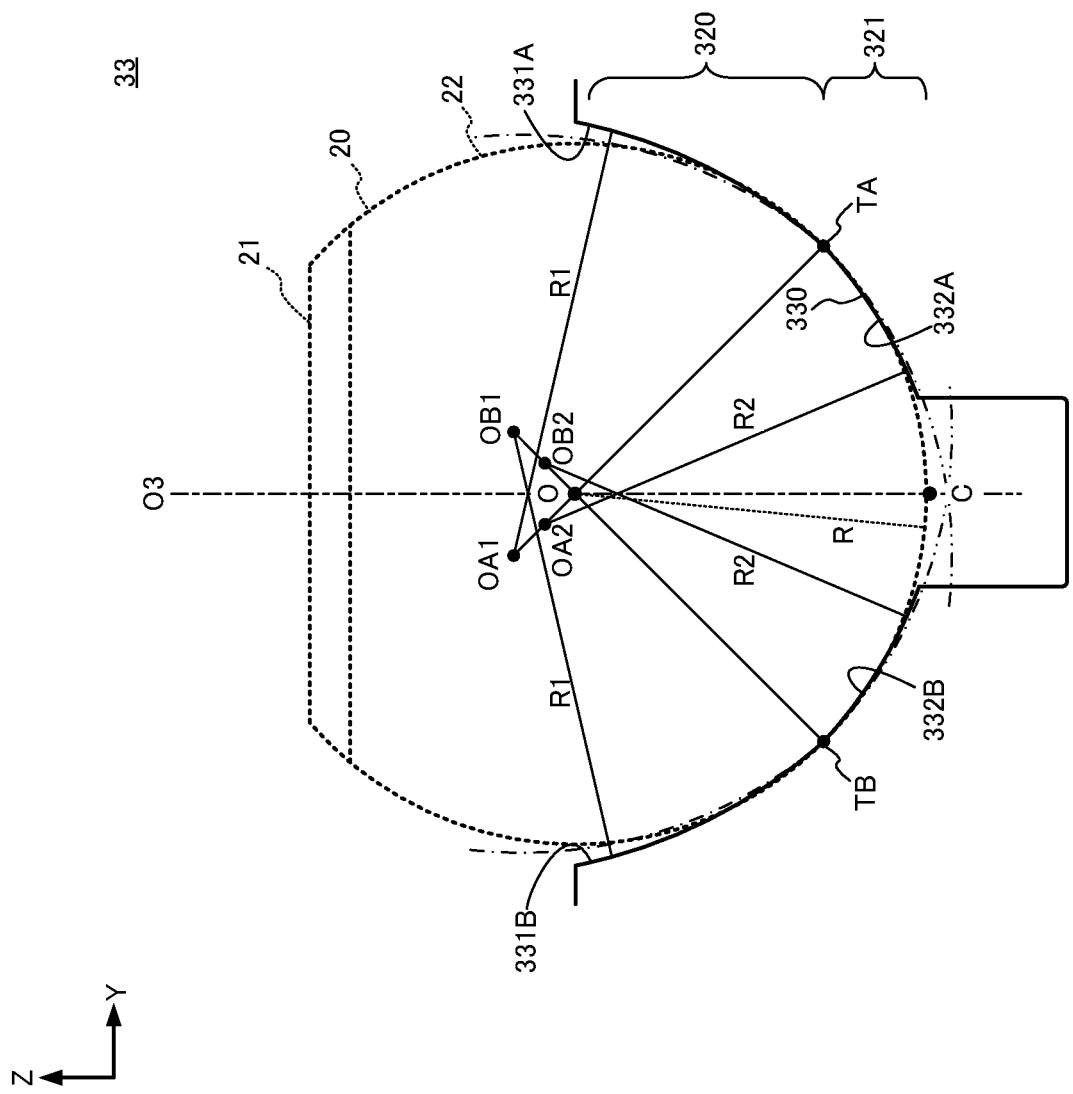
FIG. 3 is a diagram for explaining a shape of a sliding surface 33.

FIG. 3 is a diagram for explaining the shape of the sliding surface 33.

As shown in the figure, the sliding surface 33 has a concave surface 330 which comes in contact with the rear surface 22 of the rack bar 20 at two contact positions TA and TB line-symmetrical with respect to a Line O3 connecting the center O of the rack bar 20 to the center C of the bottom of the sliding surface 33 in YZ cross-section as cross-section perpendicular to the axial direction of the rack bar 20.

In the YZ cross-section, the concave surface 330 includes: a pair of first arc surfaces 331A and 331B which are positioned on the periphery side 320 of the sliding surface 33 from the respective contact positions TA and TB, being connected with the contact positions TA and TB and line-symmetrical with respect to the Line O3; and a pair of second arc surfaces 332A and 332B which are positioned on the bottom side 321 of the sliding surface 33 from the respective contact positions TA and TB, being connected with the contact positions TA and TB and line-symmetrical with respect to the Line O3.

Here, favorably, the contact positions TA and TB are set in the range where the angle (corresponding to the formed angle θ shown in FIG. 4) formed between the line connecting the center O of the rack bar 20 to each contact position TA, TB and the Line O3 is less than or equal to 50 degrees, and more favorably between 15 degrees and 45 degrees.

Further, the first arc surfaces 331A and 331B are each set so that a gap with the rear surface 22 of the rack bar 20 in the YZ cross-section is larger than the gap of the second arc surface 332A, 332B at the position of the same distance from the contact position TA, TB concerned.

In detail, in the YZ cross-section, the curvature centers OA1 and OB1 of the first arc surfaces 331A and 331B are positioned closer to the rack gear 21 in comparison with the curvature center O of the rear surface 22 of the rack bar 20 and are line-symmetrically with respect to the line O3. In the same way, the curvature centers OA2 and OB2 of the second arc surfaces 332A and 332B are positioned closer to the rack gear 21 in comparison with the curvature center O of the rear surface 22 of the rack bar 20 and line-symmetrically with respect to the line O3. Further, the curvature radius R1 of the first arc surfaces 331A and 331B and the curvature radius R2 of the second arc surfaces 332A and 332B are larger than the curvature radius R of the rear surface 22 of the rack bar 20. Further, the curvature radius R1 of the first arc surfaces 331A and 331B is larger than the curvature radius R2 of the second arc surfaces 332A and 332B.

In the back surface 326 of the rack guide sheet 32, the boss part 34 is formed to project on the opposite side to the sliding surface 33. The rack guide sheet 32 is housed in the inside of the groove part 37 of the base part 31, and is fixed to the base part 31 by pressing the boss part 34 into the sheet-fixing through-hole 36 of the base part 31.

Hereinabove, one embodiment of the present invention has been described.

In the present embodiment, the sliding surface 33 of the rack guide sheet 32 is made to be the concave surface 330 which comes in contact with the rear surface 22 of the rack bar 20 at the two contact positions TA and TB line-symmetrical with respect to the Line O3 connecting the center O of the rack bar 20 to the center C of the bottom of the sliding surface 33 in the YZ cross-section as a cross-section perpendicular to the axial direction of the rack bar 20. This concave surface 330 comprises, in the YZ cross-section: the pair of first arc surfaces 331A and 331B which are positioned on the periphery side 320 of the sliding surface 33 from the respective contact positions TA and TB, being connected with the contact positions TA and TB and line-symmetrical with respect to the Line O3; and the pair of second arc surfaces 332A and 332B which are positioned on the bottom side 321 of the sliding surface 33 from the respective contact positions TA and TB, being connected with the contact positions TA and TB and line-symmetrical with respect to the Line O3. At the same time, as for gaps with the rear surface 22 of the rack bar 20 at positions of the same distance from the respective contact positions TA and TB with the rear surface 22 of the rack bar 20, gaps of the first arc surfaces 331A and 331B are made to be larger than the gaps of the second arc surfaces 332A and 332B.

Figure 4:
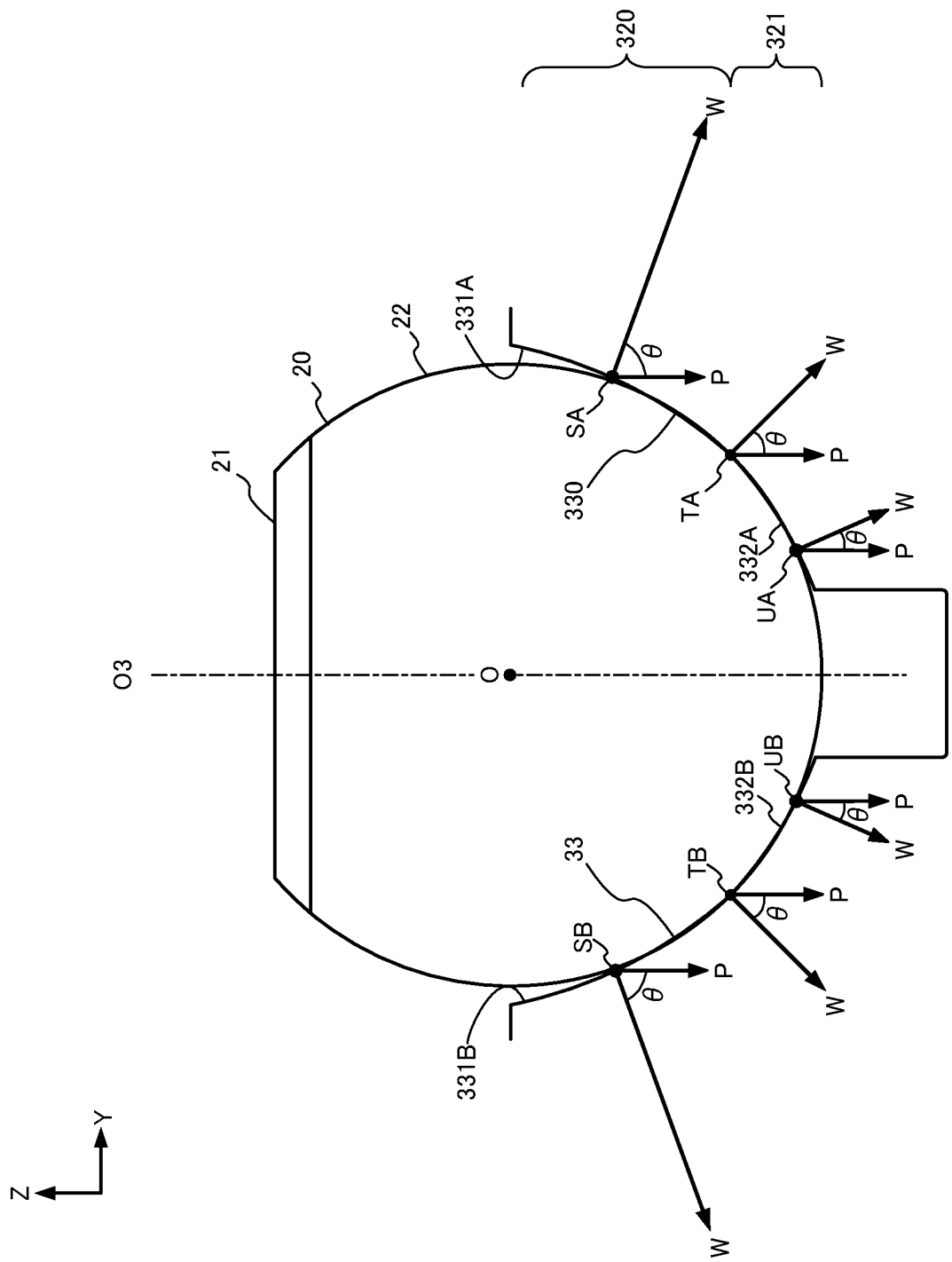
FIG. 4 is a diagram for explaining a wedge effect of the rack guide 30.

Here, as shown in FIG. 4, assuming that W is for the vertical load applied to the sliding surface 33 of the rack guide sheet 32 at a contact position with the rear surface 22 of the rack bar 20, P is for the input load (load in the direction of the Line O3) inputted to the rack guide sheet 32 from the rack bar 20 at the contact position, θ is for the angle formed between the loading direction of the vertical load W and the loading direction of the input load P, μ is for the friction coefficient, and F is for the friction force generated at the contact position of the sliding surface 33 of the rack guide sheet 32, then F=μW=μP/cos θ holds. Thus, in the case where the input load P and the friction coefficient μ are constant, the friction force F becomes larger as the formed angle θ becomes larger (wedge effect). Accordingly, in comparison with the friction force F at the contact positions TA and TB, the friction force F at contact positions SA and SB on the periphery side 320 of the sliding surface 33 from the respective contact positions TA and TB becomes larger and the friction force F at contact positions UA and UB on the bottom side 321 of the sliding surface 33 from the respective contact positions TA and TB becomes smaller.

As described above, in the present embodiment, in the case where production variation is included in the curvature radius of the sliding surface 33 of the rack guide sheet 32 or the curvature radius of the rear surface 22 of the rack bar 20 and a contact position between both surfaces deviates from the boundary between the first arc surface 331A, 331B and the second arc surface 332A, 332B (i.e. from the contact position TA, TB) to the bottom side 321 (i.e. to the side of the second arc surface 332A, 332B), the deviation is in the direction of decreasing the formed angle θ, and thus there is no problem in particular. On the other hand, in the case where a contact position deviates to the periphery side 320 (i.e. to the side of the first arc surface 331A, 331B), the deviation is in the direction of increasing the formed angle θ, and a problem is caused. However, in the present embodiment, as for gaps with the rear surface 22 of the rack bar 20 at positions of the same distance from the respective contact positions TA, TB, gaps of the first arc surfaces 331A and 331B are made to be larger than the gaps of the second arc surfaces 332A and 332B. Accordingly, it is possible to suppress increase of the formed angle θ when the deviation to the periphery side 320 occurs, and to suppress increase of the friction force between the sliding surface 33 of the rack guide sheet 32 and the rear surface 22 of the rack bar 20. Accordingly, it is possible to reduce the influence of the production variation in the curvature radius of the sliding surface 33 of the rack guide sheet 32 or the curvature radius of the rear surface 22 of the rack bar 20 while widening the contact area with the rack bar 20.

The present invention is not limited to the above-described embodiment, and can be varied variously within the scope of the invention.

For example, in the above-described embodiment, the first arc surfaces 331A and 331B and the second surfaces 332A and 332B constituting the concave surface 330 of the sliding surface 33 of the rack guide sheet 32 are set in such a way that: in the YZ cross-section as a cross-section perpendicular to the axial direction of the rack bar 20, the curvature centers OA1 and OB1 of the first arc surfaces 331A and 331B and the curvature centers OA2 and OB2 of the second arc surfaces 332A and 332B are positioned closer to the rack gear 21 in comparison with the curvature center O of the rear surface 22 of the rack bar 20, and are line-symmetrical with respect to the line O3; the curvature radius R1 of the first arc surfaces 331A and 331B and the curvature radius R2 of the second arc surfaces 332A and 332B are larger than the curvature radius R of the rear surface 22 of the rack bar 20; and the curvature radius R1 of the first arc surfaces 331A and 331B is larger than the curvature radius R2 of the second arc surfaces 332A and 332B.

The present invention, however, is not limited to this. It is sufficient that the first arc surfaces 331A and 331B and the second arc surfaces 332A and 332B constituting the concave surface 330 of the sliding surface 33 are set in such a way that, as for gaps with the rear surface 22 of the rack bar 20 at positions of the same distance from the respective contact positions TA and TB with the rear surface 22 of the rack bar 20, gaps of the first arc surfaces 331A and 331B are larger than the gaps of the second arc surfaces 332A and 332B.

Further, in the above embodiment, the steering device may be mounted with a power steering mechanism that assists movement of the pinion gear 11 or the rack bar 20 by using a motor.

Further, although the above embodiment takes an example of application to a steering device of a vehicle, application of the present invention is not limited to a steering device of a vehicle, and the present invention can be widely applied to a device using a rack-and-pinion gear mechanism such as a focusing mechanism of an optical device, for example.

REFERENCE SIGNS LIST

1: rack-and-pinion gear mechanism; 10: pinion shaft; 11: pinion gear; 12: outer peripheral surface of the pinion shaft; 13: end of the pinion shaft; 20: rack bar; 21: rack gear; 22: rear surface of the rack bar; 30: rack guide; 31: base part; 32: rack guide sheet; 33: sliding surface; 34: boss part; 35: spring guide; 36: sheet-fixing through-hole of the base part; 37: groove part of the base part; 38A: bottom surface of the base part; 38B: upper surface of the base part; 39: outer peripheral surface of the base part; 50: bearing; 40: coil spring; 60: cap; 61: inner side surface of the cap; 62: threaded portion of the cap; 70: housing; 71: rack case part; 72: cylinder case part; 73: pinion gear housing part; 74, 75: opening; 76: open end of the cylinder case part; 77: threaded portion of the cylinder case part; 78: inner wall surface of the cylinder case part; 80: elastic member; 320: periphery side of the sliding surface 33; 321: bottom side of the sliding surface; 326: back surface of the rack guide sheet 32; 330: concave surface; 331A, 331B: first arc surface; and 332A, 332B: second arc surface.

The invention claimed is:

1. A rack guide for slidably supporting a rack bar, which has a rack gear formed to engage with a pinion gear, on an opposite side to the rack gear and for guiding the rack bar in axial direction of the rack bar moving according to rotation of the pinion gear, comprising:
a sliding surface which supports an arcuate rear surface formed in the rack bar on an opposite side to the rack gear, wherein:
the sliding surface has a concave surface which is, in cross-section perpendicular to the axial direction of the rack bar, in contact with the rear surface of the rack bar at two contact positions line-symmetrical with respect to a line connecting a center of the rack bar to a center of a bottom of the sliding surface;
the concave surface includes a pair of first arc surfaces which are line-symmetrical with respect to the line and positioned on a periphery side of the sliding surface from the respective contact positions, and includes a pair of second arc surfaces which are line-symmetrical with respect to the line and positioned on a bottom side of the sliding surface from the respective contact positions; and
in the cross-section perpendicular to the axial direction of the rack bar, the first arc surfaces have larger gaps with the rear surface of the rack bar than gaps of the second arc surfaces with the rear surface of the rack bar at positions of a same distance from the respective contact positions.

2. A rack guide of claim 1, wherein:
the first arc surfaces and the second arc surfaces each have a cross-section shape whose curvature center is closer to the rack gear than a curvature center of a cross-section shape of the rear surface of the rack bar and whose curvature radius is larger than a curvature radius of the rear surface of the rack bar; and
the curvature radius of the cross-section shape of each first arc surface is larger than the curvature radius of the cross-section shape of each second arc surface.

3. A gear mechanism for changing a travelling direction of a moving body according to rotation of a steering wheel, comprising:

a pinion gear which rotates according to the rotation of the steering wheel;

a rack bar which has a rack gear formed to engage with the pinion gear and which reciprocates according to the rotation of the pinion gear owing to the engagement of the rack gear with the pinion gear, to change a direction of wheels of the moving body;

a rack guide of claim 2 which slidably supports the rack bar in an axial direction of the rack bar; and a resilient body which biases the rack guide in a direction of pressing the rack gear against the pinion gear.

4. A gear mechanism for changing a travelling direction of a moving body according to rotation of a steering wheel, comprising:

a pinion gear which rotates according to the rotation of the steering wheel;

a rack bar which has a rack gear formed to engage with the pinion gear and which reciprocates according to the rotation of the pinion gear owing to the engagement of the rack gear with the pinion gear, to change a direction of wheels of the moving body;

a rack guide of claim 1 which slidably supports the rack bar in an axial direction of the rack bar; and a resilient body which biases the rack guide in a direction of pressing the rack gear against the pinion gear.

* * * * *